United States Patent
Kulp (10) Patent No.: US 9,273,436 B1
(45) Date of Patent: Mar. 1, 2016

(54) WEED CONTROL DEVICES AND METHODS

(75) Inventor: Jack H. Kulp, Dana Point, CA (US)

(73) Assignee: TrafFix Devices, Inc., San Clemente, CA (US)

( * ) Notice: Subject to any disclaimer, the term of this patent is extended or adjusted under 35 U.S.C. 154(b) by 478 days.

(21) Appl. No.: 13/024,860

(22) Filed: Feb. 10, 2011

Related U.S. Application Data (60) Provisional application No. 61/304,213, filed on Feb. 12, 2010.

(51) Int. Cl.
| | |
|---|---|
| *E01F 15/04* | (2006.01) |
| *E04H 17/06* | (2006.01) |
| *E01C 9/00* | (2006.01) |
| *E01C 9/04* | (2006.01) |
| *E01C 9/06* | (2006.01) |
| *E01C 9/08* | (2006.01) |
| *A01G 13/00* | (2006.01) |
| *E01F 15/02* | (2006.01) |

(52) U.S. Cl.
CPC ............... *E01F 15/0469* (2013.01); *E01C 9/00* (2013.01); *E01C 9/04* (2013.01); *E01C 9/06* (2013.01); *E01C 9/08* (2013.01); *E01C 9/086* (2013.01); *E04H 17/063* (2013.01); *A01G 13/0256* (2013.01); *A01G 13/0281* (2013.01); *A01G 13/0293* (2013.01); *E01F 15/02* (2013.01); *Y10T 428/15* (2015.01); *Y10T 428/24273* (2015.01); *Y10T 428/24298* (2015.01); *Y10T 428/24479* (2015.01)

(58) Field of Classification Search
USPC ............................... 256/1; 47/20.1, 29.5, 31.1
See application file for complete search history.

(56) References Cited

U.S. PATENT DOCUMENTS

| | | | | |
|---|---|---|---|---|
| 1,905,371 | A | * | 4/1933 | Duffy .............................. 428/81 |
| 3,393,897 | A | | 7/1968 | Wright |
| 3,515,373 | A | | 6/1970 | Abbe |
| 3,704,004 | A | * | 11/1972 | Carter, Jr. ......................... 256/1 |
| 3,806,096 | A | | 4/1974 | Eccleston et al. |
| 3,822,864 | A | | 7/1974 | Keys |
| 4,976,063 | A | | 12/1990 | Young |
| 5,065,543 | A | * | 11/1991 | Brook ............................. 428/37 |
| D342,874 | S | | 1/1994 | Groves |
| 5,285,594 | A | * | 2/1994 | Penny ................................. 47/9 |
| 5,323,557 | A | | 6/1994 | Sonntag |
| 5,379,558 | A | * | 1/1995 | Mason, III ...................... 52/105 |

(Continued)

OTHER PUBLICATIONS

Roadside Management Toolbox, 2005, Landscape Architecture Programs, California Department of Transportation, USA.

(Continued)

*Primary Examiner* — David Sample
*Assistant Examiner* — Donald M Flores, Jr.
(74) *Attorney, Agent, or Firm* — Stout, Uxa & Buyan, LLP; Donald E. Stout (57) ABSTRACT

A system for controlling unwanted foliage growth about a post extending in an upright orientation from the ground comprises a mat having a first edge, a second edge separated from the first edge, a top surface, and a bottom surface. The weed mat further comprises at least one pre-formed cut portion therein for accommodating the post, so that the mat can be secured about the post. A molded-in cut line extends parallel to the edges of the weed mat. The weed mat also includes a molded-in scale system, wherein the molded-in scale system comprises a plurality of additional score lines extending from the molded-in cut line to one of the weed mat edges at pre-determined, measured increments.

23 Claims, 6 Drawing Sheets

(56) References Cited

U.S. PATENT DOCUMENTS

| | | | |
|---|---|---|---|
| 5,509,231 | A | 4/1996 | Marcoux |
| 5,522,176 | A * | 6/1996 | Suttle ............................... 47/32 |
| D393,989 | S | 5/1998 | Groves |
| 6,446,400 | B1 * | 9/2002 | Block et al. ...................... 52/102 |
| 6,505,819 | B1 | 1/2003 | Damon et al. |
| 6,527,255 | B2 | 3/2003 | O'Berry et al. |
| 6,837,487 | B1 | 1/2005 | Oden et al. |
| 2005/0108932 | A1 * | 5/2005 | Hsia ................................. 47/32 |
| 2005/0236610 | A1 | 10/2005 | Damon |
| 2005/0263749 | A1 | 12/2005 | Ballard |
| 2005/0279981 | A1 | 12/2005 | Onbey |
| 2007/0082164 | A1 * | 4/2007 | Sellers ............................ 428/43 |

OTHER PUBLICATIONS

Clines, Hardscaping with Caltrans, Better Roads Magazine, Apr. 2006, Randall-Reilly Publishing Co. LLC, USA.

* cited by examiner

WEED CONTROL DEVICES AND METHODS

This application claims the benefit under 35 U.S.C. 119(e) of the filing date of Provisional U.S. Application Ser. No. 61/304,213, entitled Weed Control Devices and Methods, filed on Feb. 12, 2010. This prior provisional application is expressly incorporated herein by reference, in its entirety.

This application is related to commonly assigned co-pending U.S. application Ser. No. 12/502,974, entitled Weed Control Devices and Methods for Traffic Safety Applications, filed on Jul. 14, 2009, and expressly incorporated herein, in its entirety.

BACKGROUND OF THE INVENTION

The present invention relates generally to weed mitigation systems, and more particularly to devices and methods for controlling weed growth under and around support posts for signs, guardrails, and other applications.

SUMMARY OF THE INVENTION

The invention described herein comprises pre-molded gaskets and mats which are adapted to fit around support posts for signs, guardrails and other applications, in the traffic safety field or otherwise. The gaskets are molded of rubber, or other suitable material, such as plastic. Portions of the gaskets and mats are pre-cut, or scored, either fully or partially though their thickness, in order to simplify ready installation of the gaskets and mats at the point of application.

More particularly, in one aspect of the invention, there is provided a system for controlling unwanted foliage growth about a post extending in an upright orientation from the ground. This system comprises a weed gasket having a first edge, a second opposing edge, a top surface, and a bottom surface. The gasket further comprises a first score line disposed in the top surface which is configured to closely surround the post, and an additional access score line which extends from the first score line to one of the edges. At least one of the edges is chamfered. In certain embodiments, the first score line is configured to accommodate an I-beam shaped post. The weed gasket is preferably comprised of rubber.

The access score line is preferably formed as a lap joint having overlapping edges, and the gasket is premolded with additional score lines sized to fit variously sized posts.

The inventive system preferably further comprises a weed mat disposed beneath the weed gasket, which has a first edge and a second opposing edge. The weed mat further comprises a molded-in cut line extending parallel to the edges of the weed mat. Advantageously, the weed mat further comprises a molded-in scale system, wherein the molded-in ruler scale system comprises a plurality of additional score lines extending from the molded-in cut line to one of the weed mat edges at pre-determined, measured increments. This plurality of additional score lines, in one currently preferred embodiment, positioned with 1 inch increments between them.

In another aspect of the invention, there is provided a system for controlling unwanted foliage growth about a post extending in an upright orientation from the ground, which comprises a mat having a first edge, a second edge separated from the first edge, a top surface, and a bottom surface. The weed mat further comprises at least one pre-formed cut portion therein for accommodating the post, so that the mat can be secured about the post. A molded-in cut line extends parallel to the edges of the weed mat. The weed mat also includes a molded-in scale system, wherein the molded-in scale system comprises a plurality of additional score lines extending from the molded-in cut line to one of the weed mat edges at pre-determined, measured increments. In a currently preferred embodiment, the plurality of additional score lines are positioned with 1 inch increments between them.

The weed control system advantageously further comprises a weed gasket having a first edge, a second opposing edge, a top surface, and a bottom surface, wherein the weed gasket further comprises a first score line disposed in the top surface which is configured to closely surround the post. The purpose of this weed gasket is to further control the growth of weeds right around the periphery of the post, which may otherwise protrude through gaps between the opening in the weed mat and the post. The weed gasket, when desired/required, is disposed atop the weed mat, such that the bottom surface of the weed gasket is adhesively attached to the top surface of the weed mat. Alternatively to the use of adhesive, the weed gasket and the weed mat may be mechanically secured together, such as by nails or spikes. In some applications, the weed gasket may be unnecessary.

In yet another aspect of the invention, there is described a method of installing a system for controlling unwanted foliage growth about a post extending in an upright orientation from the ground. The method comprises steps of placing a first weed mat adjacent to the post, orienting the mat so that a first edge thereof, having a pre-cut portion of material abuts the post, and removing the pre-cut portion of material from the first edge of the mat to form an opening large enough to fit about the post. Once the first mat is positioned as desired, a second edge of a second weed mat is slid over the first edge of the first mat, so that a pre-cut portion of material abuts an opposing side of the post. The pre-cut portion of material is removed from the second edge of the second mat to form an opening large enough to fit about the post from its opposing side. Then a weed gasket is secured snugly about the post and to the top surfaces of each of the first and second weed mats.

Each of the first and second weed mats have scale lines molded therein. The method further comprises steps of using the scale lines to properly locate the first and second mats.

The invention, together with additional features and advantages thereof, may best be understood by reference to the following description taken in conjunction with the accompanying illustrative drawings.

DESCRIPTION OF THE PREFERRED EMBODIMENT

Figure 1:
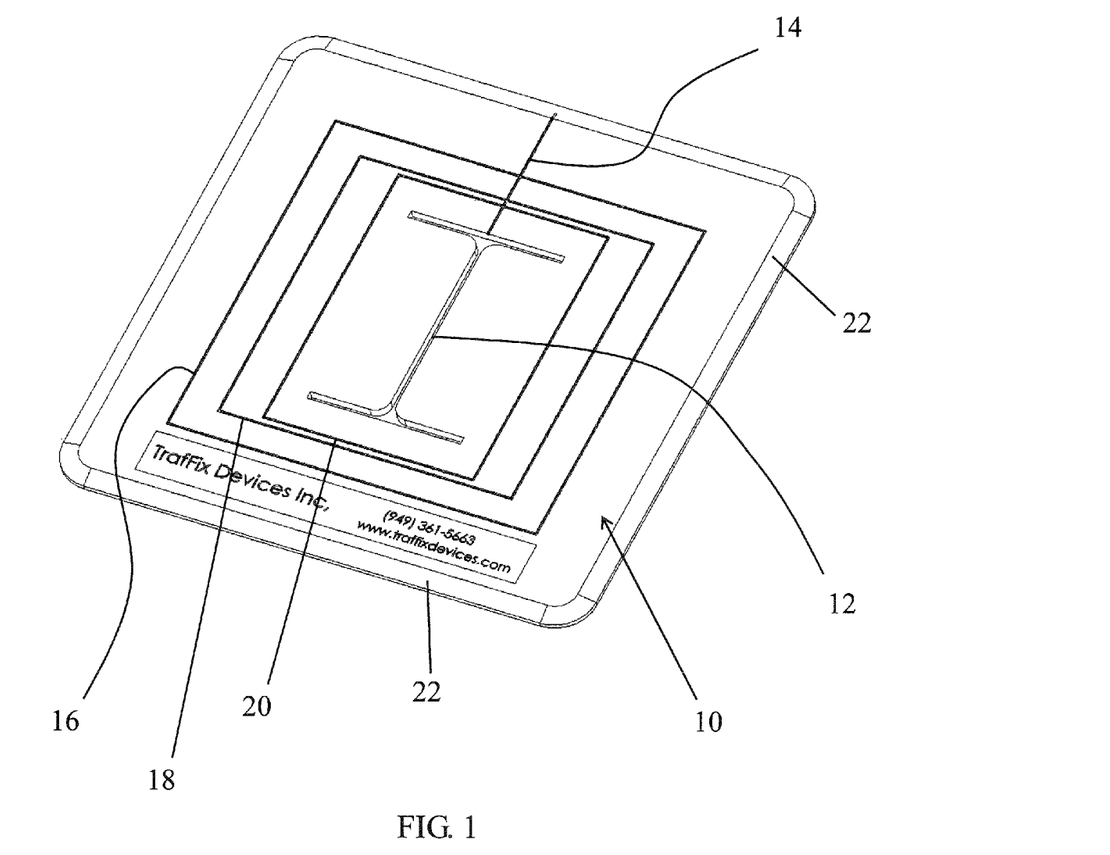
FIG. 1 is a top isometric view of one embodiment of a weed control gasket constructed in accordance with the principles of the present invention.
Figure 2:
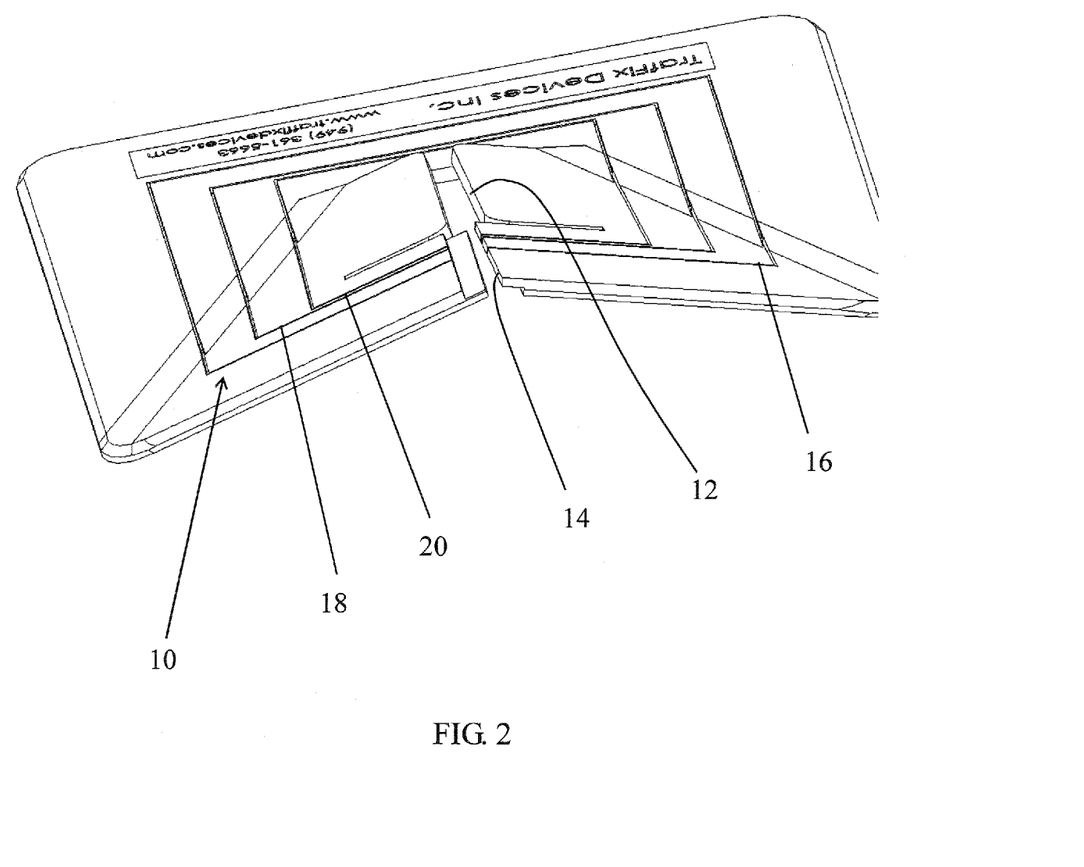
FIG. 2 is an isometric view of the device of FIG. 1, from an opposed orientation, illustrating the lap joint of the gasket in an opened state for fitting around a post.
Figure 3:
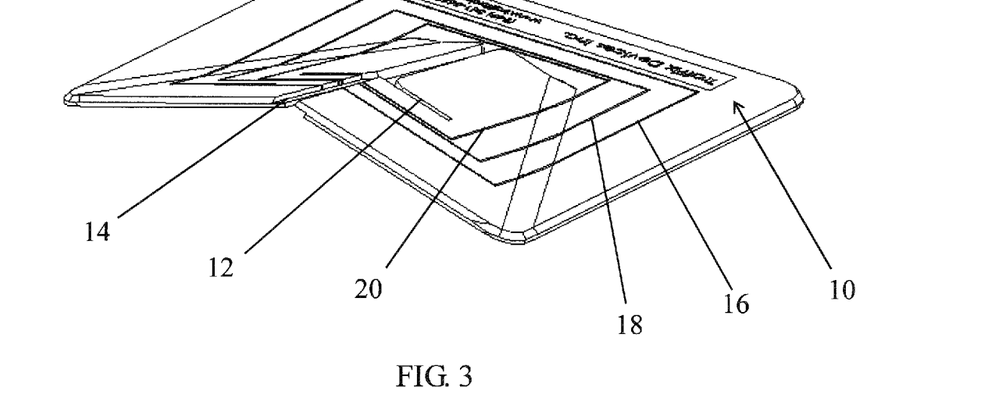
FIG. 3 is an isometric view similar to FIG. 2, from still another orientation.
Figure 4:
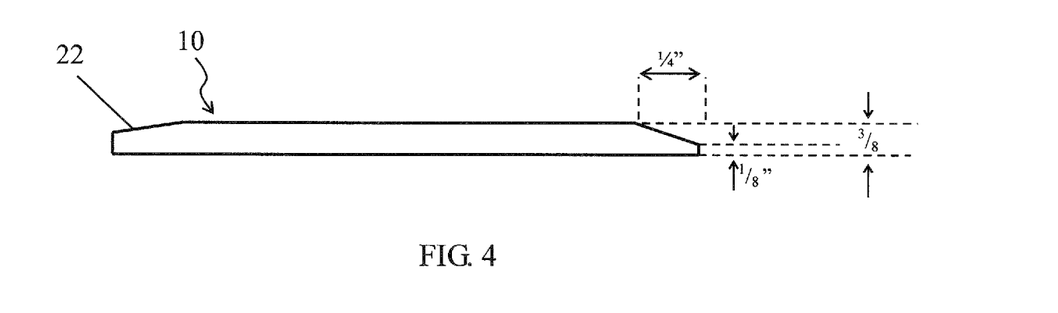
FIG. 4 is a side view illustrating the thickness of the device of FIGS. 1-3.

Referring more particularly to the drawings, there is shown in FIGS. 1-4 a weed control device or gasket 10. As illustrated, the gasket 10 is molded of rubber, preferably vulcanized rubber, though other suitable materials may be used, including recycled tire (crumb) rubber, or a suitable mixture. The preferred color is black, though it may be molded in almost any color, if desired. In the illustrated embodiment, the gasket 10 is approximately 12 or 14 inches square, having a thickness of approximately ⅜ inch, as shown in FIG. 4. Of course, these dimensions are presently preferred, but not required, and various materials and dimensions may be employed within the scope of the inventive concept.

The gasket 10 is pre-molded according to any number of configurations that will accommodate a quick installation around a support beam or post with minimal field (or on-site) cutting required. According to a first illustrated embodiment, the gasket 10 is pre-molded with a centrally located I-beam-shaped score line 12, extending through the entire thickness of the gasket, for accommodating an I-beam-shaped post commonly used, for example, to support highway guardrails. An access score line 14, preferably formed as a lap joint having overlapping edges, as shown particularly in FIGS. 2 and 3, extends from one end of the score line 12 to the edge of the gasket 14, as illustrated, for permitting the gasket to be fitted closed around an I-beam-shaped post. In the first illustrated embodiment, the gasket 10 is also pre-molded with three additional square or rectangular score lines 16, 18, 20, respectively, in decreasing sizes, which are sized to accommodate three of the most commonly sized wooden posts currently used in the traffic sign industry, and extend part of the way through the gasket thickness. Of course, the number, shape, and size of the pre-molded score lines is not particularly critical to the invention, as it is the concept of providing a plurality of pre-molded, pre-sized, pre-shaped score lines which is both inventive and advantageous. Part of the inventive concept is that these score lines can be changed over time to accommodate new or additional applications.

In the illustrated embodiment, the four edges 22 of the gasket 10 are chamfered, as illustrated particularly in FIG. 4. The chamfered edges 22 are approximately ¼ inch in width, and extend from an inner thickness of approximately ⅜ inch to an outer thickness of approximately ⅛ inch. The corners of the gasket 10 may also be radiused, as shown.

The purpose of the gasket 10 is to prevent the growth of foliage around sign posts, guard rail, cable barrier systems, and any other applications wherein it is desired, for the purpose of simplifying landscaping, to prevent weed growth, such as mail boxes, and the like. Other advantages of the product are the resultant reduced need to utilize herbicides to prevent weeds, and, as mentioned above, reduced maintenance costs.

To install the gasket 10, according to the illustrated embodiment, about a particular post, a worker transports it to the desired location, and selects the appropriate score lines for fitment to the desired post. For example, if the post is an I-beam, the installer merely separates the pre-cut score line 14 and scores lines 12, which opens up the gasket 10 as shown in FIGS. 2 and 3. Then, the gasket 10 may merely be slipped about the post, so that it surrounds and closely contacts the post along the score lines 12. If the post is shaped as provided by one of the other three score lines 16, 18, or 20, then some simple cutting will be required. Using a suitable cutting implement, such as a hook linoleum cutting knife, the worker makes the desired cuts through the appropriate score lines (16, 18, or 20), and the appropriate score line is cut out, to form an opening approximately the size of the periphery of the post. Then, as noted above, the score line 14 is separated, so that the gasket may be slipped about the post.

Once the gasket 10 is installed, the lap joint closes, and can be bonded with a suitable adhesive.

As will be described below, in addition to its separate use and utility, as discussed above, the weed gasket 10 can also be used in conjunction with the use of weed mats.

Figure 5:
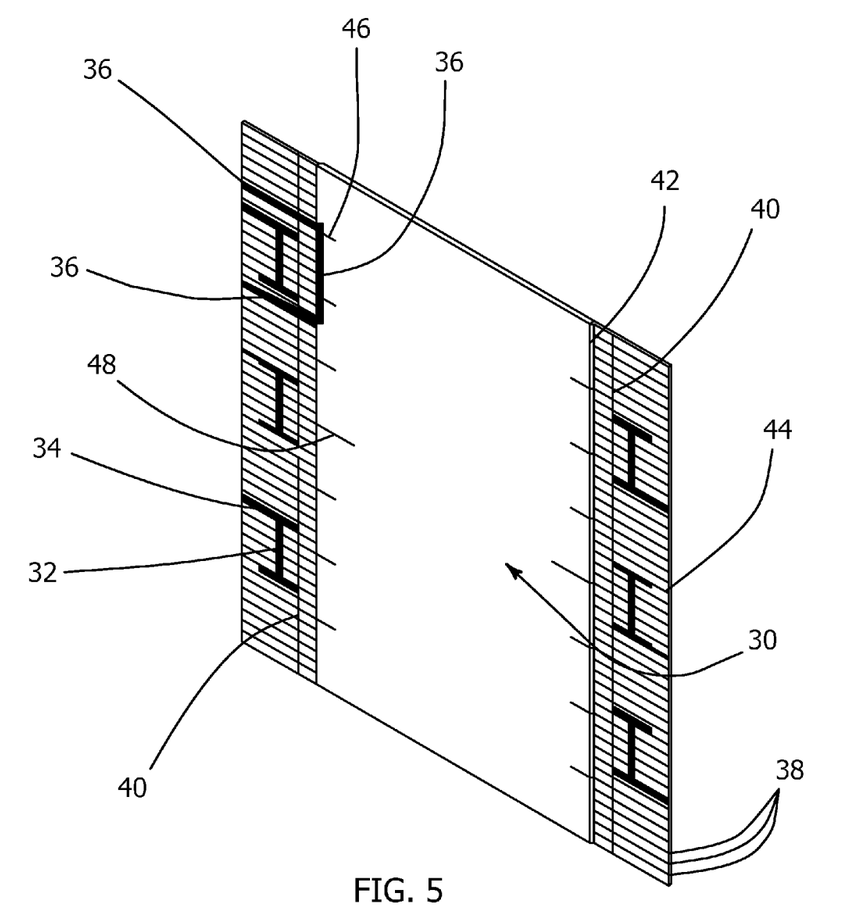
FIG. 5 is a top view of a weed control device, namely a mat, constructed in accordance with the principles of the present invention, illustrating a series of scale marks molded into the device along two parallel edges.
Figure 6:
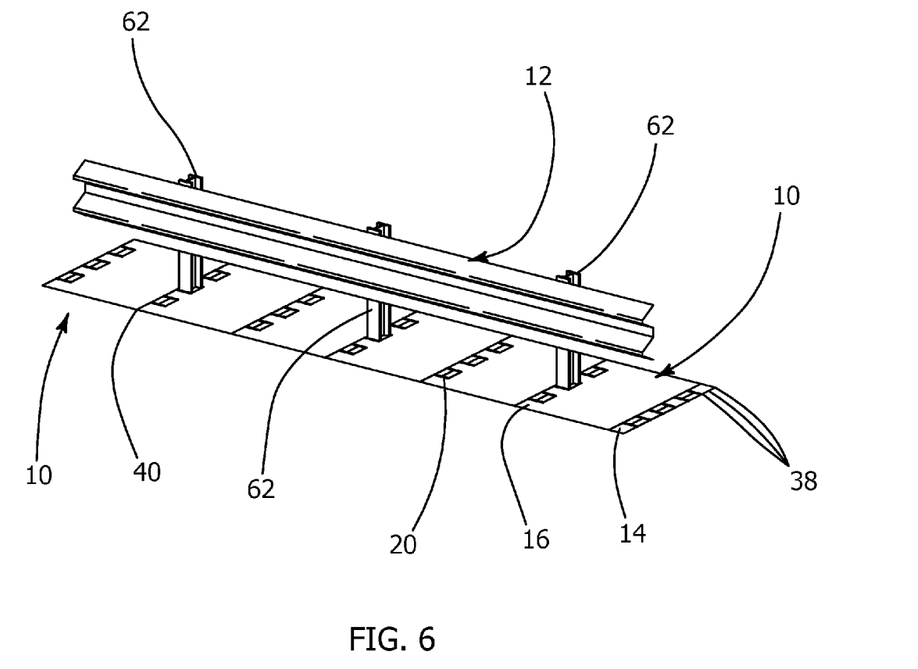
FIG. 6 is a perspective view illustrating a plurality of the weed control mats shown in FIG. 5 deployed in a typical traffic safety application.

FIGS. 5 and 6 illustrate a modified embodiment of a weed mat 30, which is similar to that disclosed in prior U.S. application Ser. No. 12/502,974, herein already expressly incorporated by reference. The weed mat 30 has pre-molded score lines 38 at regular intervals (for example, every inch) along its edges as shown in FIG. 6. These scaled score lines 38 perpendicularly intersect molded in cut lines 40, 42 parallel to the side edges 44 of the mat. Preferably, the molded in cut lines 40, 42 are positioned at 6 inches and 8 inches inward from the mat's edge, respectively. The side edges 44 of the weed mat 30 according to the illustrated embodiment may or may not be chamfered (as are the edges 22 of the gasket 10 according to the embodiment of FIGS. 1-4). This configuration is adapted for quickly cutting a square shaped hole into the surface of the mat 30 with 3 straight cut lines 36, as described in greater detail below. A square cut minimizes field cutting and fits posts of any shape so long as the square length and width are bigger than the post dimensions such that the post fits into and through the square. At the same time, some field cutting permits more accurate placement of the weed mat relative to the roadside. A plurality of pre-scored lines 32, 34, 36, 38, 40, 42 provides options for quick on-site or field cutting and facilitates accurate on-site alignment and positioning despite lack of uniformity from one site to the next.

Further advantages of the weed mat 30 are as follows:
(i) Scale marks 38 at 1 inch intervals along the edges 44 of the weed mat 30 allow the installer to locate the mat to the guardrail posts without having to guess where to make the cuts if the three pre notched "I" beam locations 32 are not suitable. This feature is beneficial for situations where guardrail posts are staggered or along a curved road;
(ii) A 6 inch notch 40 and an 8 inch notch 42 are disposed parallel to the sides 44 for the mat to accept guardrail posts of these sizes;
(iii) To meet a prevalent guardrail standard of 12'6" long with 3 posts per guardrail (posts are spaced 75" from post center to post center), the mat overlap flaps have been extended out an additional inch per side (2 inches per mat) to fit 2 mats between posts without any gaps in between the mats over the distance of a long install. This increases the mat width from 43½" to 45½";
(iv) The "I" beam profile can be difficult to cut and install around the beam and too time consuming on-site. Therefore, instead of the "I" profile being a complete recessed profile, a notched outline outside of the profile with an additional ⅛" clearance has been added to make it easier to cut and peel out the profile and install. The notch marks for this profile preferably go to a ⅛" depth. This reduces the installation time of the mat;

(v) At every 6" there are extended notches 46 to denote that it is a 6" mark, and halfway along the mat at a centerline thereof, there is a further extended notch 48 that denotes that this is the middle of the mat. These features are also used to align the mat with guardrail posts for installation; and (vi) The length of the flap has been extended inwards to provide an 8 inch flap.

The weed mat 30 provides a skid resistant surface, and functions to retard foliage growth by preventing sunlight from reaching the ground surface, thus retarding seed germination. The mat 30 also restricts water contact with the underlying ground surface.

Optionally, the weed mat 30 may be a percolation mat of increased porosity to permit some percolation of water through the mat. A mat of increased porosity may be formed, for example, by using less rubber per mold and/or larger shreddings or buffings of rubber in the mold.

In certain embodiments, including an embodiment of the weed mat 30 as otherwise disclosed above, optionally, the mat may be a filtration mat that permits passage of some materials through it while preventing the passage of other materials. Materials that are not transmitted through the mat may be left on the surface of the mat or retained or absorbed by the mat material. The mat material may be treated to give it additional properties in order that it may react with or treat some of the materials that are caught by the filter and left on the surface of the mat or absorbed by it. For example, the mat may be used to restrict the passage of heavy metals or toxic chemicals into farmland adjacent the highway or into the groundwater, or nearby oceans, lakes, rivers, streams, etc. The mat design may also be adapted for covering sewers near construction zones to prevent construction debris or paint from entering the sewer and interconnected water systems. In this manner, the mat may reduce municipal water treatment costs and ecological cleanup costs.

In certain embodiments, optionally, the weed mat may be used to encourage the growth of certain desirable species of ground cover vegetation in the vicinity of it. For example, ice plant or marathon grass may be considered desirable species for some applications. This may be accomplished by loading the mat with seeds of certain preferred species known to be suitable for an area prior to installation of the mat over guardrail posts, or for other applications. The mat may have percolation and/or filtration features to optimize growth of the preferred plant species. Post-installation germination and growth of the plant species may serve to further root and stabilize the mat on the roadside. Preferred species growing out of the mat may also be used to improve the aesthetics so that the roadside landscape otherwise covered by weed mats look more natural with low level ground cover developing over the mats. The low level ground cover may, in turn, provide greater separation between auto exhaust (and other chemicals) from the road and roadside agriculture or natural areas.

Any one or more of these features (percolation, filtration, selective seed germination) may be combined in a single weed mat for multiple functionality.

In order to more accurately position the weed mat 30 relative to the paved edge of the road's shoulder or median such that an edge 44 of the mat aligns along and parallel to the paved edge, it is desirable to have more score lines 32, 34, 36, 38, 40, 42 in the mat 30 to accommodate varying conditions at sites of installation (such as curved roads or a lack of uniformity) and varying positions of the roadside relative to the posts. The mat 30, according to the embodiment shown in FIG. 5, comprises more score lines 32, 34, 36, 38, 40, 42. With more score lines, the roadside edge of the mat can be positioned first and then the proper score lines, 32 or 36, selected for further cutting.

According to a presently preferred embodiment, the surface of the weed mat 30 has a series of 1 inch scale marks 38 molded into it along one or more edges 44, as shown in FIG. 6. The 1 inch scale marks 38 are up to 8 inches long (distance from mat edge 44 to inner molded-in cut line 42). The 1 inch scale marks intersect two continuous molded in cut lines 40, 42 that extend the full length of the mat from top to bottom. According to a preferred embodiment, the 1 inch scale marks 38 intersect the two continuous molded in cut lines 40, 42 at 6 inches and 8 inches, respectively, from the edge 44 of the mat 30.

One of the chief advantages of this molded-in scale system 38 is that it enables the installer to shift the location of the weed mat 30 in relation to the guard rail support posts in the direction of the highway in 1" increments as desired or needed. Consequently, the installer is able to position the mats 30 where desired relative to the road's edge, then simply make 3 straight cuts 36 the proper distance in from the edges 44 of the mat to the post's position along the pre-scored lines 36.

When the support post around which the mat is placed has a periphery other than square-shaped, for example an I-beam shape, it can be too labor intensive (and cost ineffective) to make the necessary number of cuts in the mat on site in order to provide a proper tight fit of the mat around the irregularly shaped, for example I-beam shaped, post. Therefore, when the post has an I-beam shape, the access score line 34 can be used to open up the pre-cut "I" shaped score line 32 for wrapping around the post.

Another often preferred way to handle the issue of non-square shaped posts (rather than making a minimum of 8 cuts on site to fit the I-beam) is to make a square cutout in the mat 30 with 3 straight cuts 36. Subsequently, a weed gasket 10 (see FIG. 7 and FIG. 8), pre-cut to fit an irregularly shaped post (for example, I-beam) is placed over the weed mat 30. The weed gasket 10 may be constructed as illustrated in FIGS. 1-4, and can be secured to the weed mat 30 with an adhesive (for example, TrafFix Devices™ rubber adhesive) or nailed in place through both the weed mat 30 and gasket 10 (for example, with a 6 inch long galvanized ground spike). The gasket 10 may also be manufactured from vulcanized rubber. According to a preferred embodiment, the gasket 10 fits an I-beam shaped post and is a 14"×14" square having a pre-molded 6"×6" "I" beam opening therethrough, with an overlapping assembly joint, again, as generally discussed in connection with the gasket embodiment shown in FIGS. 1-4.

In this manner, a procedure that further cuts pre-scored lines 36 to form a square shape (with just 3 straight cuts 36) can be used as a time sensitive and cost effective way to fit the weed mat 30 about a post of any shape and size. The pre-scored lines 36 may be selected from a plurality of pre-scored lines 38 at regular intervals along a surface of the mat 30 after proper placement of the weed mat's edge 44 along the roadside edge.

Figure 7:
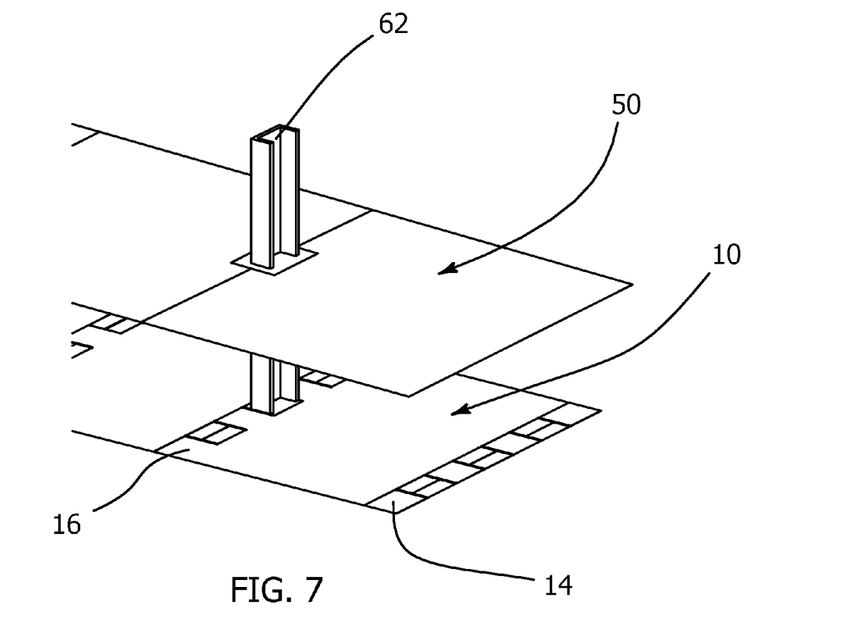
FIG. 7 is a perspective view showing the weed control mats of FIG. 5 deployed in a typical traffic safety application and further showing a weed control gasket, like that illustrated in FIGS. 1-4, disposed around the post and above the weed control mat.
Figure 8:
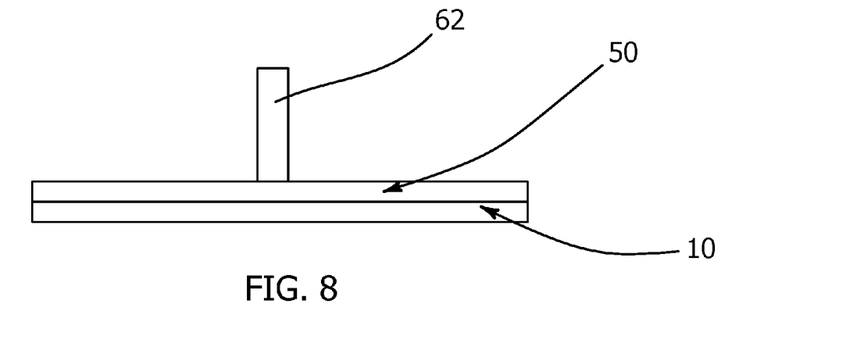
FIG. 8 is a side view of a portion of the arrangement of FIG. 7 showing a weed control gasket like that shown in FIGS. 1-4 disposed over a weed control mat like that shown in FIGS. 5 and 6, with both devices being disposed about a typical post.

As discussed above, when necessary, a tighter fit can be achieved around non-square shaped posts by the subsequent positioning of a weed gasket 10 (as shown in FIG. 7 and FIG. 8), placed over the weed mat 30, designed to fit the unique shape of the post precisely. That is, the weed gasket 10 may be custom-designed with a pre-cut opening to match a horizontal cross-section of the post. In a preferred embodiment, the weed gasket 10 has an I-beam shape to accommodate the relatively common I-beam shape post. However, according to different embodiments, the weed gasket 10 could have an infinite number of different types of support post/beam openings of different shapes, molded using different weed gasket molds, customized for specific support post designs regardless of post shape or size.

The function of the weed gasket 10, in this context, is to provide a better seal around the post by filling the space between the larger square-shaped outline of the hole cut into the weed mat 30 and the smaller non-square periphery of the post. This gap-filling improves aesthetics and prevents weed growth in the area immediately surrounding the post. To provide this functionality the weed gasket 10 may, but need not, have greater density or thickness in the region immediately surrounding the cut-out (to match post shape) as compared to other areas of the weed gasket 10 farther away from the cut-out, such as along the edges. The other areas of the gasket, excluding the gap-filling region surrounding the cut-out, are already covered by the weed blocking mat 30 so they need not be as thick or dense. In these other areas, the thickness or density simply needs to be sufficient to adequately secure the weed gasket 30 to the surface of the weed mat, as through adhesive bonding or nailing, without damaging the integrity of either component.

Thus, the customized weed gasket therefore can be quickly and easily installed over the weed mat cut with a square opening at the support beam locations. The gasket 10 can easily be placed tightly around any shaped post and then glued or nailed in place at the post joint, effectuating a tight, no field-cutting, weed-resistant joint.

While the invention is disclosed for use with the posts of traffic safety barriers, such as traffic signs, guardrails, and the like, it is useful for any other application wherein weed control, percolation, filtration, and/or selective seed germination are desired, both on and off roadway, such as for signs, playground equipment, walls, fences, sewers, and the like. If the pre-formed score lines are not suited to a particular application, the gasket 10 may be cut to customize its application. Crack sealant may be advantageously used to fill any holes or tears surrounding the posts 62, etc., to minimize penetration of the mat by water, sunlight, or growing foliage.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for controlling unwanted foliage growth about a post extending in an upright orientation from the ground, comprising:
   a weed gasket having a first edge, a second opposing edge, a top surface, and a bottom surface, said gasket further comprising a first score line disposed in said top surface which is configured to closely surround the post, and an additional access score line which extends from said first score line to one of said first and second edges; and
   a plurality of weed mats joined together and disposed beneath said weed gasket, said weed mats each having a first edge and a second opposing edge, said two joined together weed mats being larger in area than said weed gasket;
   wherein said weed gasket is entirely disposed atop said two joined together weed mats, so that no portion of the bottom surface of the weed gasket is in contact with the ground and a substantial portion of the top surface of the two joined together weed mats is uncovered by the weed gasket.

2. The system as recited in claim 1, wherein said first score line is configured to accommodate an I-beam shaped post.

3. The system as recited in claim 1, wherein said weed gasket is comprised of rubber.

4. The system as recited in claim 1, wherein said access score line is formed as a lap joint having overlapping edges.

5. The system as recited in claim 1, said gasket being premolded with additional score lines sized to fit variously sized posts.

6. The system as recited in claim 1, wherein said first score line is configured to closely surround a first particularly sized and configured post, the weed gasket further comprising a second score line disposed in said top surface which is configured to closely surround a second differently sized and configured post, wherein neither of the first and second score lines extend to any edge of the weed gasket, the additional access score line extending from each of the first and second score lines to one of the first and second edges of the weed gasket.

7. The system as recited in claim 6, said weed mat further comprising a molded-in cut line having a length equal to a length of each of the first and second edges, the entire length of the molded-in cut line extending parallel to each of the first and second edges of the weed mat.

8. The system as recited in claim 7, said weed mat further comprising a molded-in scale system, wherein the molded-in scale system comprises a plurality of additional score lines extending from said molded-in cut line to one of said weed mat edges at pre-determined, measured increments.

9. The system as recited in claim 8, wherein said plurality of additional score lines are positioned with 1 inch increments between them.

10. The system as recited in claim 1, wherein at least one of said edges is chamfered.

11. The system as recited in claim 1, wherein said plurality of weed mats comprises a pair of weed mats adjoining one another along respective edges thereof, to form a joint between the adjoined weed mats, the weed gasket lying atop the joint so that a first portion of the weed gasket lies atop one of the pair of weed mats, and a remaining portion of the weed gasket lies atop the other of the pair of weed mats.

12. A system for controlling unwanted foliage growth about a post extending in an upright orientation from the ground, comprising:
   a weed mat having a first edge, a second edge separated from and parallel to said first edge, a top surface, and a bottom surface, said mat further comprising at least one pre-formed cut portion therein for accommodating a square or I-beam-shaped post, so that the mat can be secured about the post;
   a molded-in cut line having a length equal to a length of each of the first and second edges, the entire length of the molded-in cut line extending parallel to the first and second edges of the weed mat, separate from said at least one pre-formed cut portion, wherein the top surface of the mat has the same thickness on each side of the cut line;
   a molded-in scale system, wherein the molded-in scale system comprises a plurality of additional score lines extending transversely from said molded-in cut line to one of said edges at pre-determined, measured increments; and
   a weed gasket having a first edge, a second opposing edge, a top surface, and a bottom surface, said gasket further comprising a first score line disposed in said top surface which is configured to closely surround the post, wherein said weed gasket is disposed atop said weed mat.

13. The system as recited in claim 12, wherein said plurality of additional score lines are positioned with 1 inch increments between them.

14. The system as recited in claim 12, wherein the bottom surface of said weed gasket is adhesively attached to the top surface of the weed mat.

15. The system as recited in claim 12, wherein the weed gasket and the weed mat are mechanically secured together.

16. The system as recited in claim 12, wherein the molded-in cut line intersects with a plurality of the at least one pre-formed cut portions.

17. The system as recited in claim 12, wherein some of the additional score lines do not intersect with any of the at least one pre-formed cut portions.

18. The system as recited in claim 12, wherein predetermined ones of the additional score lines have a greater length than the remaining additional score lines, to denote particular larger increments.

19. A system for controlling unwanted foliage growth about a post extending in an upright orientation from the ground, comprising:
   a weed gasket having a first edge, a second opposing edge, a top surface, and a bottom surface, said gasket further comprising a score line disposed in said top surface which is configured to closely surround the post; and
   a plurality of weed mats joined together and disposed beneath said weed gasket, said weed mats each having a first edge, a second opposing edge, a top surface, and a bottom surface, and a score line disposed in said mat top surface which is configured to surround the post much more loosely than the gasket score line, the two joined together weed mats being larger in area than the weed gasket;
   wherein said weed gasket is entirely disposed atop said two joined together weed mats, so that no portion of the bottom surface of the weed gasket is in contact with the ground and a substantial portion of the top surface of the two joined together weed mats is uncovered by the weed gasket.

20. The system as recited in claim 19, said gasket being premolded with additional score lines sized to fit variously sized posts.

21. The system as recited in claim 19, wherein said gasket score line is configured to closely surround a first particularly sized and configured post, the weed gasket further comprising a second score line disposed in said top surface which is configured to closely surround a second differently sized and configured post, wherein neither of the first and second score lines extend to any edge of the weed gasket, the weed gasket further comprising an additional access score line extending from each of the first and second score lines to one of the first and second edges of the weed gasket.

22. The system as recited in claim 21, said weed mat further comprising a molded-in cut line extending parallel to the edges of the weed mat.

23. The system as recited in claim 22, said weed mat further comprising a molded-in scale system, wherein the molded-in scale system comprises a plurality of additional score lines extending from said molded-in cut line to one of said weed mat edges at pre-determined, measured increments.

* * * * *